July 8, 1958  A. ROTH  2,842,029
ATTACHMENT FOR SPECTACLES
Filed Dec. 13, 1954

INVENTOR.
Aaron Roth

United States Patent Office 2,842,029
Patented July 8, 1958

2,842,029

ATTACHMENT FOR SPECTACLES

Aaron Roth, Brooklyn, N. Y.

Application December 13, 1954, Serial No. 474,883

5 Claims. (Cl. 88—41)

This invention relates to improvements in attachments for spectacles, and relates more particularly to an attachment that can be a supplemental glass to add a bifocal to normal reading or far-sight glasses, a night-driving non-glare attachment, and a sun glass, one object of the invention being the provision of an attachment of this type which can readily be adjusted with relation to normal glasses or a non-glass frame, thus providing a novel and useful device of this type.

In order that the invention may be understood, attention is invited to the accompanying drawings, in which.

Figure 1:
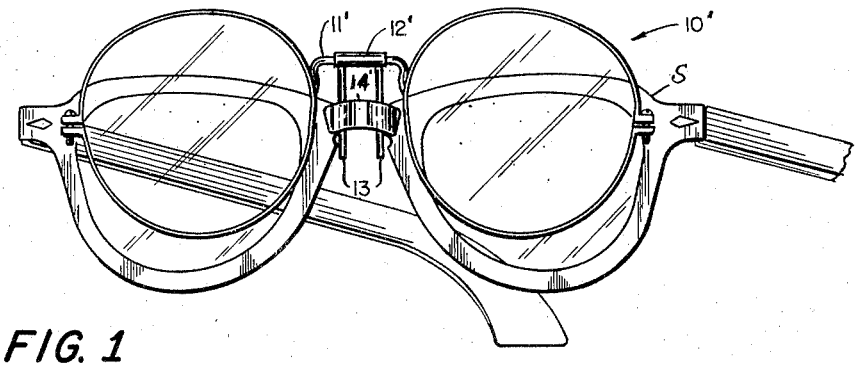
Figure 1 is a front view of the attachment fitted upon a pair of spectacles.
Figure 2:
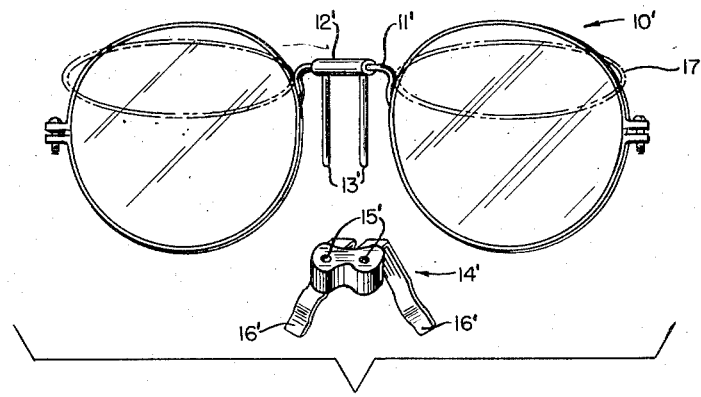
Figure 2 is a detached perspective view of the attachment per se.

Referring to the drawings, and to Figs. 1 and 2, the spectacles S, carry an attachment 10', whose metal male hinge member 11', has frictionally fitted thereon, a sleeve 12', which permits the attachment to be swung and disposed at any desired angle, whereas the two spring terminal rods 13', of the member 11', constitute with the receiver 14' and its receiving bores 15', a frictional support for the member 11'. Thus this permits vertically sliding movements to the attachment, which attachment is bodily yet removably carried by the spectacles. It will also be noted that the member 14' has terminals 16', which engage and are fixed to the bridge of the spactacles S. Thus, in this manner, the auxiliary bowless and lensless frame 10', with or without its lenses 17', may be carried by the main spectacles, to be elevated vertically and/or swung outwardly, as desired, and especially in a position of selectivity for alternate clear view or tinted view, where tinted lenses are used, as for night driving. The attachment may be made for vertical movements only, by making the connection at the hinge member fixed.

Figure 3:
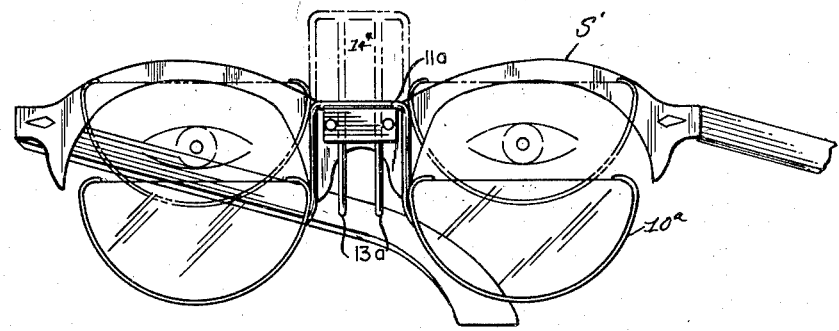
Figure 3 is a view of a modified form, as used with lenseless frames.

In the modification shown in Fig. 3, the spectacle frame is a non-lens or open frame type as indicated at S', and a block 14ᵃ is fitted to the spectacle frame and is provided with two parallel bores as in the receiver 14', to frictionally receive the two spring terminal rods 13a, while the male hinge member 11ᵃ has a frictional sleeve as that of 12', as in the other figures, and the entire attachment being operable similarly to those previously described.

Figure 4:
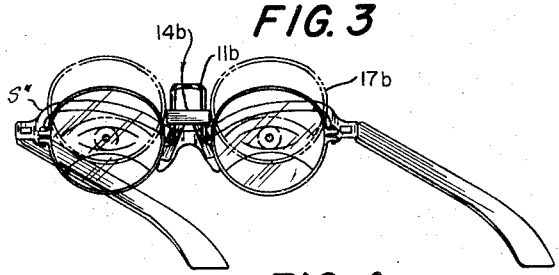
Figure 4 is a rear perspective view of a pair of farsighted or distance glasses with another modified form of the attachment carried thereby.

In Fig. 4, an attachment 17b, carries a bi-focal arrangement, so that it can be adjusted with relation to the farsightable spectacles S'', through a block 14b, and a spring member 11b. Thus this attachment with the spectacles S'' provides an adjustable reading pair of spectacles, the main spectacles being provided with the usual distance lenses.

From the foregoing description, it is evident that there is here provided a novel and desirable attachment that will fulfill the needs now prevalent in sun-glasses, bifocal attachments, and night driving non-glare glasses, and one that can be used on normal spectacles, or just lensless frames.

Thus it will be seen that lenses without power, made of plastic material or plain glass, quartz and the like can be used with this attachment.

What is claimed is:

1. The combination of a spectacle frame and an auxiliary bowless lens frame for selective use in front of the spectacle frame, comprising a spectacle frame bridge member means providing vertical bore means, said auxiliary bowless frame carrying lens means and having a horizontal bar interconnecting the lens carrying means, elongated rod means carried by said bar means, said bore means and rod means frictionally engaging each other whereby said bowless lens frame may be lowered to a desired position directly in front of the spectacle frame or elevated to a desired position up to a level where the lower edge of the bowless frame is above the field of vision thru the spectacle.

2. An attachment for a spectacle frame, said attachment including a member having means for attaching it to the bridge of the spectacle frame said member having a horizontal bearing member a supplemental bowless frame carrying lens means and provided with a bridge means comprising an elongated element extending thru said bearing member, said member having bore means and said supplemental frame bridge means having elongated rod means frictionally and adjustably held for sliding movement in said bore means whereby the supplemental frame may be lowered to a position directly in front of said spectacle frame or elevated to a desired position directly in front of said spectacle frame even up to a level where the lower edge of the supplemental frame is above the area of vision thru the spectacle frame.

3. The combination as claimed in claim 1 where the interconnecting horizontal bar means of the supplemental bowless spectacle frame is hingedly connected to the horizontal element of the elongated rod means by a frictional sleeve whereby the supplemental bowless frame is swingable independently of the vertical adjustment.

4. The combination as claimed in claim 2 in which the elongated element is rotatably mounted in said bearing element to provide swinging movement for said bowless lens frame, the said bowless lens frame being swingable independently of the vertical adjustment.

5. Combination as in claim 2 in which the attachment is permanently fixed to the spectacle frame.

References Cited in the file of this patent

UNITED STATES PATENTS

| 716,194 | Conn | Dec. 16, 1902 |
| 980,070 | Cowan | Dec. 27, 1910 |
| 2,300,364 | Wagner | Oct. 27, 1942 |
| 2,326,787 | Lorig | Aug. 17, 1943 |
| 2,545,673 | Pozarik | Mar. 20, 1951 |
| 2,582,554 | Mendelsohn | Jan. 15, 1952 |
| 2,687,671 | Mosher | Aug. 31, 1954 |

FOREIGN PATENTS

| 305,513 | Great Britain | Feb. 6, 1929 |
| 848,461 | France | July 24, 1939 |